Figure 1:
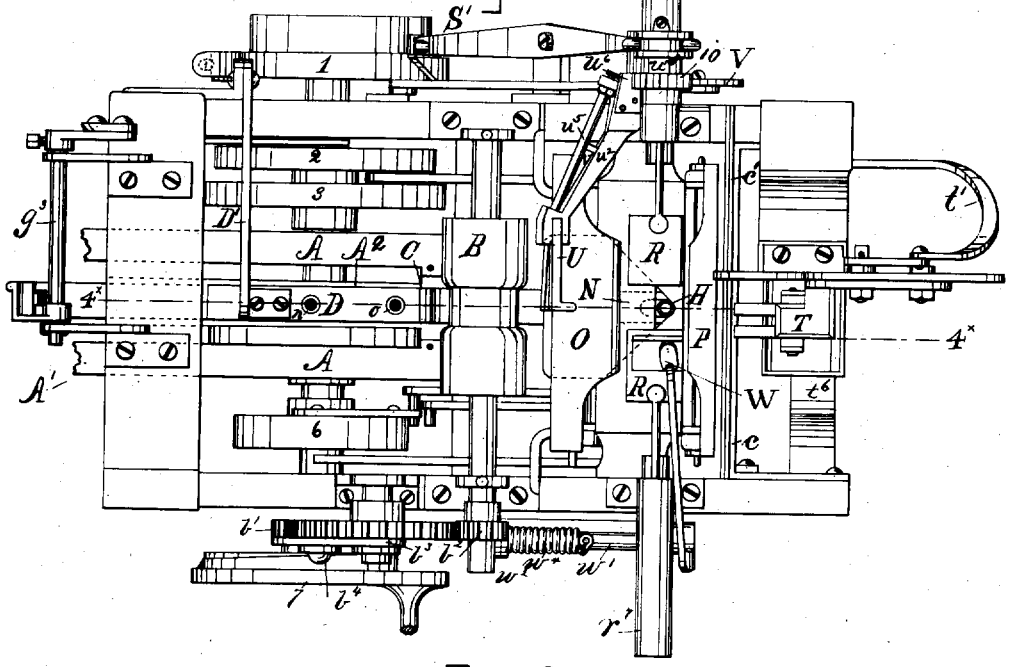

4 Sheets—Sheet 1.

A. B. GLOVER,

Assignor by mesne assignments, to THE EASTERN PAPER BAG COMPANY.

Paper Bag Machine.

No. 9,428. Reissued Oct. 19, 1880.

WITNESSES—
N. E. Whitney.
V. D. Dearborn.

INVENTOR—
Almon B. Glover
by Crosby & Gregory
Attys

A. B. GLOVER,

Assignor by mesne assignments, to THE EASTERN PAPER BAG COMPANY.

Paper Bag Machine.

No. 9,428. Réissued Oct. 19, 1880.

WITNESSES.

N. E. C. Whitney.

V. D. Dearborn.

INVENTOR.

Almon B. Glover by Crosby & Gregory Attys

A. B. GLOVER,

Assignor by mesne assignments, to THE EASTERN PAPER BAG COMPANY.

Paper Bag Machine.

No. 9,428. Reissued Oct. 19, 1880.

WITNESSES-
W. E. Whitney.
R. D. Dearborn.

INVENTOR-
Almon B. Glover
by Crosby & Gregory Attys

4 Sheets—Sheet 4.

A. B. GLOVER,

Assignor by mesne assignments, to THE EASTERN PAPER BAG COMPANY.

Paper Bag Machine.

No. 9,428. Reissued Oct. 19, 1880.

WITNESSES—
N. E. C. Whitney.
V. D. Dearborn.

INVENTOR—
Almon B. Glover
by Crosby & Gregory
Att'ys

UNITED STATES PATENT OFFICE.

ALMON B. GLOVER, OF BIRMINGHAM, CONNECTICUT, ASSIGNOR, BY MESNE ASSIGNMENTS, TO THE EASTERN PAPER BAG COMPANY.

PAPER-BAG MACHINE.

SPECIFICATION forming part of Reissued Letters Patent No. 9,428, dated October 19, 1880.

Original No. 200,654, dated February 26, 1878. Application for reissue filed July 23, 1880.

*To all whom it may concern:*

Be it known that I, ALMON B. GLOVER, of Birmingham, in the county of New Haven and State of Connecticut, have invented certain new and useful Improvements in Machines for Making Paper Bags; and I do hereby declare that the following is a full, clear, and exact description of the invention, which will enable others skilled in the art to which it pertains to make and use the same, reference being had to the accompanying drawings, and to the letters of reference marked thereon, which form a part of this specification.

This my invention has for its object the production of a machine for the manufacture of that class of paper bags having satchel bottoms.

In this class of machines it has been common, before this my invention, to form the diamond fold by means of a finger, over which the open end of the tube has been moved, as in the Knight patent, No. 116,842; and so, also, a rotating drum provided with a jaw has been made to grasp one ply of a tubular paper blank at one end and to carry it forward to a finger, over which the open end of the tubular blank, one ply of which is so held by this jaw, is drawn until the finger extended within the blank from the outside and acting against the inner ply thereof lays back one ply of the blank and forms the diamond fold.

In this my invention the web of paper is fashioned into a tube about a former having extended in front of it a follower or inner plate, which is retained within and supports the tube near its open leading end during the formation of the diamond fold, said follower, besides keeping the upper and lower plies of the tube separate, also acting to hold one ply in proper horizontal position, while the other ply is seized or grasped by a circularly-moving ply-griping device and carried backward in a direction opposite the direction of movement of the tube, when acted upon by the tube-feeding mechanism, such backward movement of the ply-griping device with one ply of the tube grasped thereby, while the other ply is held by the follower or inner plate within it, laying or forming the usual diamond fold. As the ply-griping device carries back one ply, as described, the center or transverse fold for the diamond fold is defined by means of a crimping-plate that is extended across the tube, it bearing upon the ply, being lifted by the ply-griping device. The diamond fold having been formed, holding-plates, such as used in the Knight patent, are moved forward from each side of the tube over and down upon the central part of the diamond fold, holding it in place, while the first and second cross or final folding blades, acting against the under sides of the front and rear corners of the diamond fold, are made to approach the center line or central crease of the diamond fold, sweeping the said corners one toward the other, forming the two cross or final folds, that, properly pasted, complete the satchel bottom. The bottom finished, the tube is fed forward for the proper distance and cut off, and its free or leading end is again opened and acted upon, as just described.

To insure in a positive manner that that ply of the tube to be seized by the ply-griping device shall be placed in exactly the proper position to be grasped by the ply-griping device, I have provided at the front end of the inner plate, within the tube, an opening device or finger that is acted upon at the proper time and turned just far enough to insure the separation of the two plies and hold the ply resting upon it in position to be easily and surely grasped by the ply-griping device. This finger or lifter enables the machine to operate with certainty.

Figure 2:
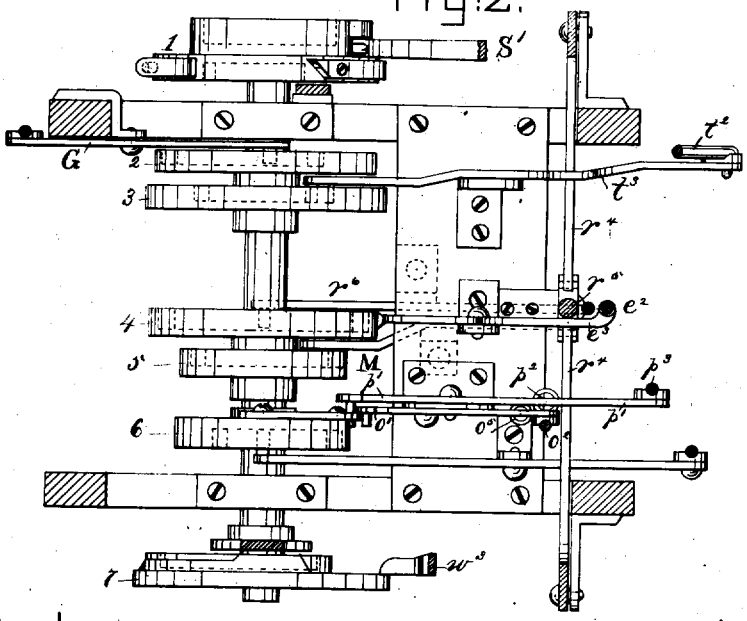
Figure 3:
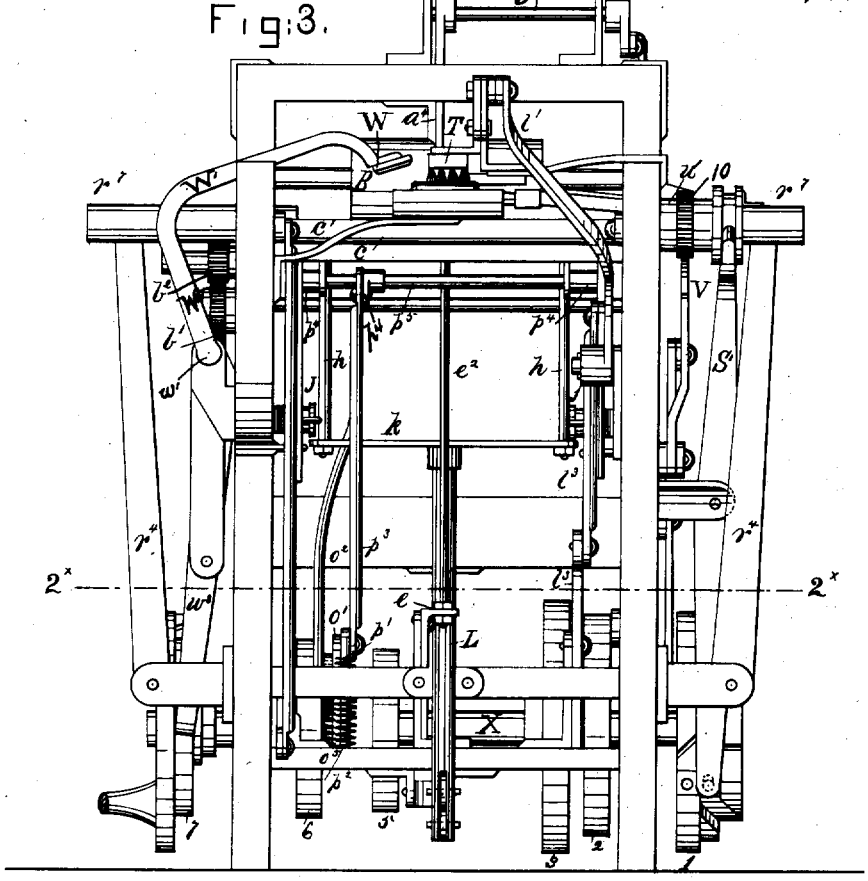
Figure 5:
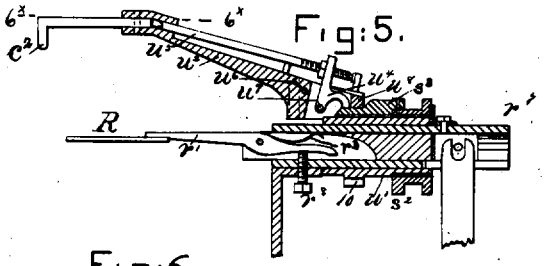
Figure 7:
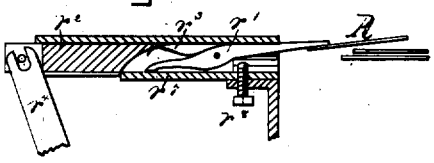
Figure 6:
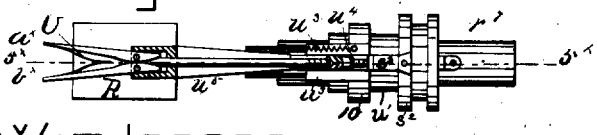
Figure 4:
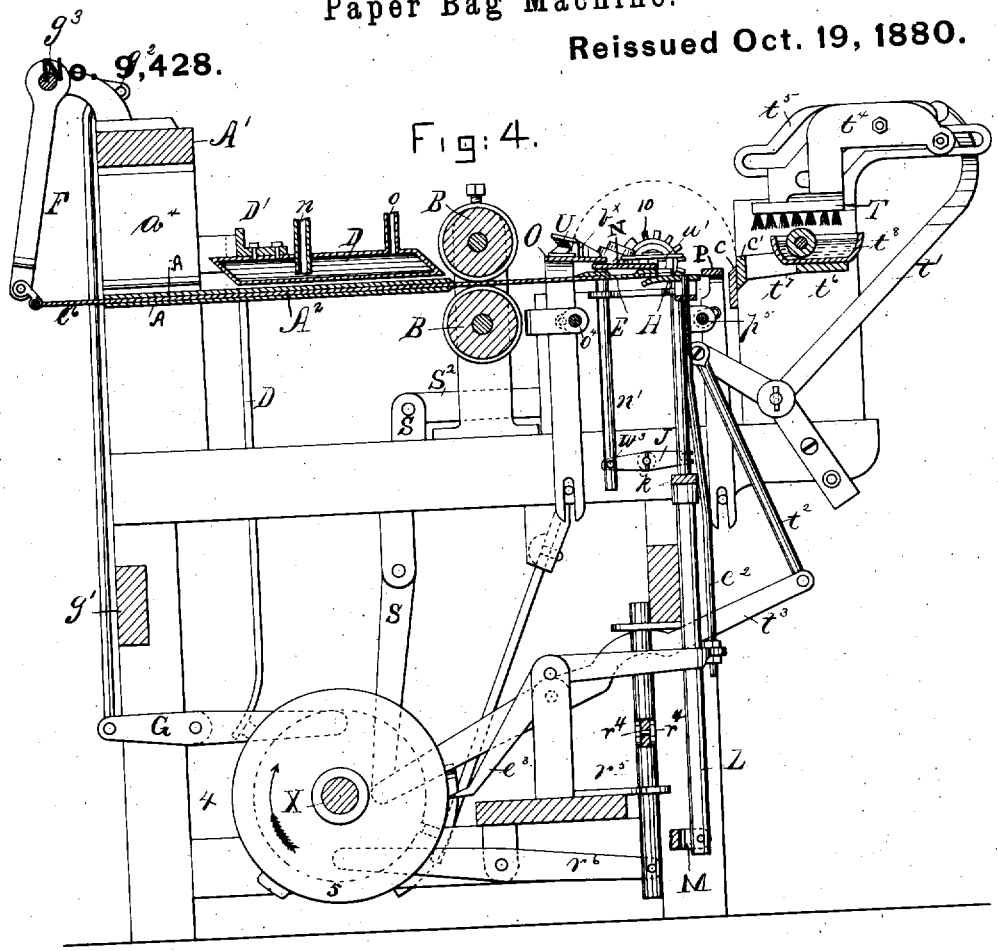
Figure 8:
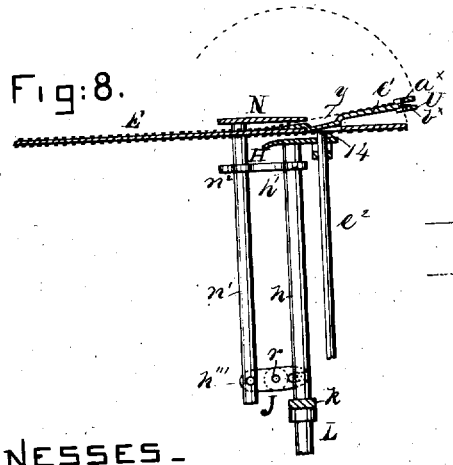
Figure 9:
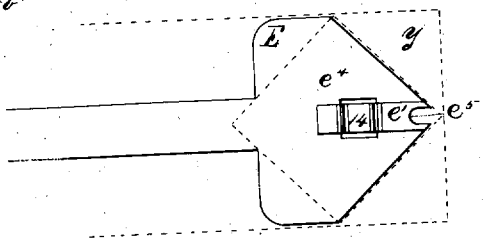

Figure 1 is a plan view of a machine embodying my invention, the parts being in the position they will occupy just after the ply-griping device has laid back one ply of the tube in the formation of the diamond fold, the bag not being, however, shown; Fig. 2, a longitudinal horizontal section on the line 2× 2×, Fig. 3; Fig. 3, an elevation of the delivery end of the machine; Fig. 4, a vertical longitudinal section through line 4× 4× of Fig. 1; Fig. 5, a sectional detail on the line 5× 5× of Fig. 6; Fig. 6, a plan view of the ply-griping device below the dotted line 6× 6× of Fig. 5; Fig. 7, a sectional detail of the side folder drawn back; Figs. 8 and 9, details showing the follower or device located within the tube as the diamond fold is being made by the ply-griping device, which engages one ply of the tube and lays or draws it back; and Figs. 10, 11, 12, and 13 are diagrams of the devices for automatically folding and finishing the bag-bottom, the said figures showing, in succession, the operations necessary for that purpose.

The frame-work A′ is of proper shape to support the working parts.

A A represent the outside, and $A^2$ the central part, of the skeleton tube-former, about which the web of paper is folded as it is drawn automatically into the machine from the roll after one edge of the paper has been properly supplied with paste in any usual way.

In practice the portions A A will extend backward nearly to the tube-pasting devices; but in the drawings they are shown broken off near the receiving end of the machine.

The central part, $A^2$, of the tube-former is connected with the side pieces, A A, by cross-pieces, as at C. (See Fig. 1.) The skeleton tube-former is supported from the frame or arch A′ by the hanger $a^4$, so that one edge of the paper may pass over and the other under the lower part of the hanger.

The outside pieces, A A, of the former may in practice be expanded or contracted in width, or, rather, be adjusted laterally with relation to each other, or may be changed for others to accommodate for the manufacture of bags of different width.

Above the flattened central portion, $A^2$, of the former is placed the hollow steam-box D or drier, to set or dry the pasted seam in the tube supported centrally over the part $A^2$. This steam-drier D is connected with a lever, D′, operated by a cam, 1, on the cam-shaft X, so as to raise the drier just before the paper tube is fed forward and lower it as soon as the tube comes to rest, it thus operating to partially dry or set by heat the pasted seam of the tube. The box may have a steam-inlet at *o* and an exit at *n* for steam and water of condensation.

The intermittingly-acting paper-feeding rollers B B, which serve to draw the web of paper from the roll about the skeleton-former into the machine to form the tube and feed it and the bag out of the machine, are grooved centrally to permit the passage between them of the shank $e^6$ of the inside plate, E, or follower, which at all times during the formation of the diamond fold remains within and holds down one ply of the tube while the other ply is grasped and laid or carried backward. This shank $e^6$ reciprocates in bearings formed for it in the central portion, $A^2$, of the former. The inside plate, E, is shown as somewhat of triangular form, its two forward edges being equally but reversely inclined from the end of the plate backward, (see Fig. 9,) its inclined edges acting to accurately define the diagonal folds of the leading half of the diamond fold.

The finger $e'$, located at the front end of the plate E, is so operated as that it positively insures the correct presentation or positioning of that ply of the tube to be engaged by the ply-griping device U.

The shank $e^6$ derives its reciprocations at the proper times from the arm or lever F on the shaft $g^3$, a short arm, $g^2$, of the said shaft being connected by link $g'$ with a lever, G, actuated by the cam 2 on shaft X.

The finger $e'$ is pivoted upon the plate E, and just as the diamond fold is to be made by turning back one ply of the tube it is lifted above the plate E, (see Fig. 8, this figure being exaggerated in this particular,) so as to separate one from the other ply of the tube (shown in dotted lines) by means of a lifting-rod, $e^2$, guided in suitable brackets and connected at its lower end with the lever $e^3$, actuated at the proper time by the cam 5.

The finger $e'$ is notched opposite where the ply-griping device is to grasp one ply of the tube, to thus prevent the ply-griping device from seizing the finger as it is closed upon one ply of the tube preparatory to being moved in a semicircular path.

The rest plate or table H is supported by the guided and vertically-movable rods *h*, connected at their lower ends with the cross-bar *k*, attached to the rod L, raised at the proper times by the lever M, actuated by the cam 5. The crimping-plate N, extended across the machine and forward partially across or substantially to the center of the table H, is supported on guided rods *n′*, connected loosely at their lower ends with levers J, pivoted centrally at *r*, the said levers being at their other ends connected with the rods *h*, thus insuring for the table and crimping-plate simultaneous movements in opposite directions.

R R are side holders or guides, the width of which determines the width of the bottom of the bag. They may be made of any desired width adapted to the size of the bag, and may be removed and exchanged, as need be, for others of any required size. They are attached to arms or levers *r′*, (see Figs. 5 and 7,) which are severally connected to the slides $r^2$, a spring, $r^3$, serving to bear down upon the rear end of each of the levers *r′*, and to normally throw upward the holders R R when they are not otherwise forced downward. The slides $r^2$ are each connected with an angle-lever, $r^4$, and these levers at their lower and inner ends are jointed to a vertical rod, $r^5$, which connects with a lever, $r^6$, deriving its motion from cam 4. The movements of the side folders inward and outward are coincident and simultaneous. As the slides $r^2$ within the hollow arms $r^7$ are moved forward by the said levers $r^4$ the rear ends of the holder-carrying levers *r′* strike the adjustable holder-depressing devices, (shown as screws $r^8$,) which so turn the levers *r′* as to force downward the holders R R, pressing the tube upon the crimping plate and table.

The first cross folder or blade, O, for forming the cross-fold at the rear of the diamond fold, is reciprocated forward and backward over the holders R by the rock-shaft $o^4$, cranks or arms thereon, pitman $o^2$, lever $o'$, and cam 6, a spring, $o^5$, moving the lever $o'$ in the opposite direction.

The second cross-folder or blade, P, is moved upward and forward and backward and downward by the rock-shaft $p^5$, cranks $p^4$, rod or pitman $p^3$, lever $p'$, and cam 6, the spring $p^2$ moving the lever $p'$ in a direction opposite that of the said cam.

The ply-griping device U, to catch and carry back one ply of the tube, while the other ply is held down and separated from it by the follower or inner plate, and form or lay the diamond fold, is shown as composed of two jaws, $a^\times$ $b^\times$, having lips $c^2$, the jaws being pivoted upon an arm, $u^2$, of a tubular hub, $u'$, which arm is fulcrumed at $u^6$. A dog, $u^4$, made as an elbow-lever, pivoted at $u^7$ in arm $u^2$, is acted upon by the wedge $s^3$ attached to the collar $s^2$ as the collar is moved forward, and the dog so turned on its pivot moves the rod $u^5$ longitudinally, causing its wedge-shaped end (see Fig. 6) to act upon and close the jaws $a^\times$ $b^\times$ of the ply-griping device upon one ply of the tube. the hub $u'$ just before this having been turned or rotated sufficiently far to place the lugs $c^2$ of the ply-griping device in the position shown in Fig. 10, at which time the parts are as in Fig. 8, in which latter figure the dotted lines denote the tube, upon one ply of which the ply-griping device is to be closed, as in Fig. 10, preparatory to partially revolving the hub and carrying the ply-griping device to the position shown in Fig. 11, which figure shows one ply of the tube drawn back and the diamond fold laid.

The ply-griping device receives a circular movement of about one hundred and eighty degrees over the arc represented by the curved dotted lines, Figs. 4 and 8, by means of the lever S, (see Fig. 4,) link $S^2$, and toothed segment V, which is made to engage the pinion 10 on the hub $u'$.

The collar $s^2$, carrying the wedge $s^3$, is moved forward and backward at the proper times by the lever S′, Figs. 1 and 2, actuated by the cam 1, the forked upper end of the said lever entering an annular groove made in the said collar, as shown in the drawings. A suitable spring operates to move the dog $u^4$ and rod $u^5$ backward when the wedge $s^3$ and collar $s^2$ are moved backward.

Figure 10:
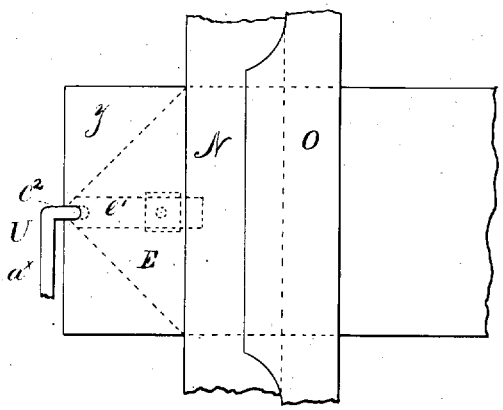

The finger $e'$, attached to the plate E, so as normally to remain down substantially at the level of the said plate, is designed to open the end of the paper tube to aid the ply-griping device in taking hold of one ply of it, as in Figs. 8 and 10, the finger at that time being positively lifted, as before described. This finger $e'$, between its ends, has a downward bend or depression, 14, that enters the opening made through the plate E. The lifting-rod $e^2$ acts against one ply of the paper opposite this depression 14 and opening in the plate E, and thus obviates breaking that ply of the paper as the finger is lifted.

T is a paster-brush for pasting the bottom of the bag. It is operated by a lever, $t'$, which is connected by a link, $t^2$, with a cam-lever $t^3$, which is actuated by the cam 3. The upper end of $t'$ is pivoted to a slide, $t^4$, which carries this paster-brush T. This slide, by means of guides which run in irregular slots in a vertical plate, $t^5$, secured to a bracket, $t^6$, gives to the brush its proper movement to receive its paste from the pasting-roller $t^7$ in the paste-cup $t^8$, and also downward and other movements to deliver its paste to the proper part of the folded bottom of the bag, and then to withdraw therefrom and return to its original position, ready for the next pasting action. The place on the bottom of the bag at which it deposits the paste is distinctly shown at Fig. 11.

W is a pad, which is brought down upon the folded bottom to cause the folded parts to adhere more closely together after the bottom is fully folded and before the folders commence to recede. It is then raised a little, and acts as a guide to keep the folds from rising, so as to permit their passage through the shears, hereinafter mentioned, when the bag is fed forward by the feed-rolls. This pad is operated at the proper periods through the agency of its arm W′, rock-shaft $w'$, crank $w^2$, and cam-lever $w^3$, which latter is actuated by a cam-projection on the driving or hand wheel 7, a coiled spring, $w^4$, on the shaft $w'$ serving to return the pad to its normal position.

$c$ $c'$ are the shears for cutting off from the tube the finished bag, one of the blades of these shears being preferably stationary.

The feed-rollers B are driven by appropriate gears $b'$ $b^2$ and a pawl or clutch, $b^3$, connected to a yoke-bar, $b^4$, which is actuated from the main shaft.

In the operation of the machine it will be supposed that the flattened tube enveloping the former has been drawn forward by the feed-rolls B and passed under the crimping-plate N and over the table H until the leading end of the tube reaches the shears $c$ $c'$, which cut off the tube transversely, the plate E at that time being nearly up to the shears. Just as the tube is to be cut off the feed stops and the table H is made to rise and the crimping-plate to drop and grasp the tube between them.

I will now describe the operation of forming a bag from that portion of the tube between the shears and the feed-rollers. This portion of the tube, as it has been stated, is held clamped between the crimping-plate and table, with the point of the inner plate, E, nearly up to the shears. As the upper shear-blade descends the ply-griping device U is turned down, following closely after the shears, until the ply-griping device is brought into nearly a horizontal position, it being thus brought into position to engage one ply of the end of the tube formed by the shears at that descent. The shears having cut the tube, the finger $e'$ is lifted by the rod $e^2$, opening the end of the tube, as in Fig. 8, when the ply-griping device takes hold of the raised ply of the paper-tube opposite the notched end of the finger grasping the said ply, as in Figs. 8 and 10. The ply-griping device is then rotated backward, carrying with it the ply of paper grasped by it, while the other or lower ply is held down by the follower, laying backward upon the tube that ply of it held by the ply-griping device, forming the diamond fold represented in Fig. 11, the diagonal forward end of the plate E defining the diagonal folds of the diamond fold. As the ply-griping device is moved to carry backward that ply grasped by it, as in Fig. 10, it bends that ply over the crimping-plate N, extended transversely across the tube, as in Fig. 10, the crimping-plate defining the usual central crease or fold for the diamond fold or bag-bottom. As the ply-griping device reaches its backward position and completes the diamond fold the holders R R are moved forward, as in Fig. 11, over the diamond fold and lowered upon and so as to hold it upon the crimping-plate and table. During the time that the holders are so moved the paster, operated as described, is caused to apply paste to the diamond fold, as shown by the dotted lines, Fig. 11, the paster in practice sliding a short distance forward and backward in contact with the paper to brush on the paste and make better work than could be done by simply printing it on, as by pressing the paster upon and then lifting it from the paper. After the ply-griping device, in its downward movement, has partially folded across the crimping-plate the ply of the tube held by it, and before the ply-griping device or the holders R R have arrived at the positions denoted in Fig. 11, the table H is lowered a little and the crimping-plate correspondingly raised to release their hold upon the tube and the follower within it sufficiently to permit the follower and inner plate, E, to be, by a quick movement, withdrawn backward behind the front edge of the crimping-plate, when the table H and crimping-plate are again quickly brought together to clamp the paper between them, and it is after this that the ply-griping device and holders complete their movement indicated in Fig. 11, and the ply-griping device is then released from the ply held by it and started forward.

Figure 12:
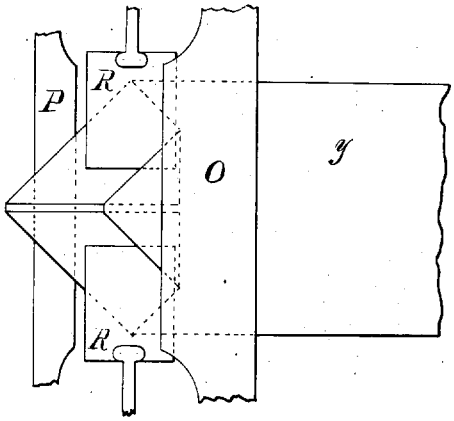
Figure 11:
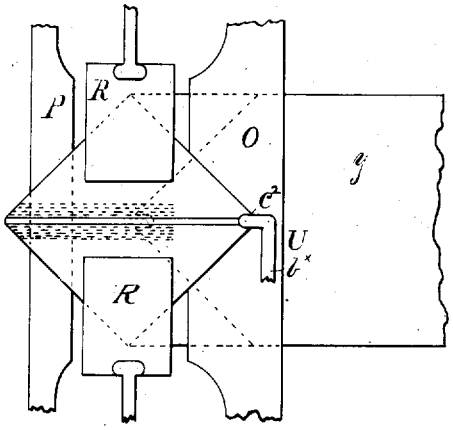
Figure 13:
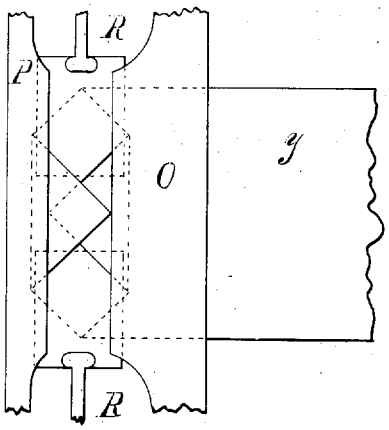

The paster is moved back out of the way of the first cross-folder or blade, O, which latter is then thrown forward in the direction of the movement of the tube from the position Fig. 11 to the position Fig. 12, sweeping the rearmost corner of the diamond fold, laid and held substantially parallel with the tube, forward over the holders R, forming in the diamond fold the first cross-fold. Then the second folder or blade, P, is thrown upward and forward from the position Fig. 12 to that shown in Fig. 13, sweeping the leading corner of the diamond fold back over the holders, as in the said Fig. 13, forming the second cross or final fold, lapping the pasted leading corner of the diamond fold over upon the opposite corner previously folded over and yet held by the first folder, O. The point-pressing pad W is then caused to descend upon the corners previously lapped over by the folders O P and press the said corners and parts of the bag-bottom closely together, causing the pasted parts of the paper to adhere and complete the bag-bottom. This done, the side-folders commence to withdraw, but the cross-folders O P keep their position until the holders are so far withdrawn as to be no longer in contact with the parts of the paper folded over or about them, when the cross-folders O P are drawn back and returned to their first or normal positions and the pad rises. This timing of the movement of the holders and cross-folders, moving the holders back first, prevents the unfolding or drawing back of those parts of the bag-bottom folded over upon the holders by the cross-folders. Should the cross-folders be withdrawn first, their pressure and friction on the folded corners of the diamond fold between them and the holders would more or less pull back the said lapped corners. After this the table and crimping-plate are separated to release the tube, leaving the completed bottom and more or less of the tube, according to the length of the bag to be formed, to be fed forward between the open blades of the shears, which at the proper time act to cut off the tube, completing the bag. While the feed is moving the tube forward in this way the pad W is raised but little above the bag-bottom and the follower is thrust forward, the two co-operating together to insure the correct entrance of the bag-bottom and its tubular connected parts between the shears, and after this the pad is completely raised, and the end of the tube is again in readiness to be operated upon, as already described, to form the bottom for another bag.

Prior to my invention it had been customary to pinch a tube, cause vertically-placed side plates to move forward, meet the side edges of the projecting free end of the tube or tubular blank, and form a diamond fold by pressure against the tube from its folded side edges inward, and after this vertically-movable plates have acted upon the corners of the diamond fold, projecting above and below the body of the tube at right angles, and have laid such corners over the side-folders, and after this the bag-bottom has been partially turned over to bring the completed bottom next to and in contact with the main part or body of the tube for packing.

The rolls may be adjusted to feed any desired length. While they are feeding forward and outward one of the finished bags, and also drawing along the paper tubing for another, the former-plate is coming forward at the same time to its position to form the bottom of the next bag.

In this my apparatus it will be noticed that the ply-griping device engages one ply of the tube just as the tube is severed, and carries one ply directly backward, while the other ply of the tube is supported or guided internally quite to the extreme end of the tube, and that I form the bag-bottom at the end of the long tube before I sever the bag-length from the tube.

I do not claim a follower provided at its front end with two springs the normal tendencies of which are to remain separated, and which, when permitted to open, co-operate with rollers to form at the end of the tube a diamond fold.

I claim—

1. In a paper-bag-making machine, a follower or inner plate located within the tube at its leading end, combined with a circularly-moving ply-griping device to grasp and carry backward one ply of the tube, while the other ply is held from following it by the follower or plate within it, substantially as described.

2. In a paper-bag-making machine, a follower or inner plate located within the tube at or near its leading end, and a circularly-moving ply-griping device to grasp and carry backward one ply of the tube, combined with the crimping-plate extended transversely across the ply, being laid back by the ply-griping device to define the central or transverse crease for the diamond fold, substantially as described.

3. In a paper-bag-making machine, the inner plate, E, located within the tube, and having the oppositely-inclined or diagonal edges, combined with means to lay back one ply of the said tube in the formation of the diamond fold, the diagonal edges of the said plate defining the diagonal folds in the leading end of the diamond fold, substantially as shown and described.

4. In a paper-bag-making machine, the finger and support for it within the tube at its leading end, combined with means to act upon and lift the finger to lift or separate one from the other ply of the tube, substantially as described.

5. The combination, in a paper-bag-making machine, of the finger located within the tube, its support, also located within the tube, means to lift the finger to separate one ply of the tube from the other, and ply-griping device to engage one ply of the tube and carry or lay it back upon itself, while the other ply is held internally and prevented from following the ply-griping device, substantially as described.

6. The combination, in a paper-bag-making machine, of the former located within the tube, the crimping-plate extended transversely across the tube, and circularly-moving ply-griping device to grasp one ply of the tubular piece of paper and positively carry it backward upon itself, substantially as set forth.

7. In a paper-bag-making machine, the table and crimping-plate and means to operate them simultaneously in opposite directions to clamp and release the tube, combined with the feeding mechanism for the tube and the follower and the ply-griping device to grasp one ply of the tube and carry it back, substantially as shown and described.

8. In combination, the rocker-arm F, the skeleton-tube former $A^2$, suspended and supported as described, the reciprocating shank or shover $e^6$, and the plate E, and the recessed or grooved rollers B B, substantially as and for the purposes described.

9. The triangular former E, provided with a notch at its tip or point and with an opening, $e^4$, through its body, as and for the purposes set forth.

10. The combination of the vertically-reciprocating crimping-plate N and the similarly-actuated table H, operating by separating to permit the withdrawal of the follower, and by closing together to clamp the tube between them to make the bottom of the bag, substantially as described.

11. The combination, with the follower, of the finger $e'$, loosely attached thereto, and a lifting device operating to elevate said finger, the construction permitting the finger, when released by the lifter, to freely drop to place by its own gravity, for the purposes described.

12. The ply-griping device U, combined with the arm $u^2$, hub $u'$, rod $u^5$, dog $u^4$, sliding collar $s^2$, and wedges $s^3$, substantially as and for the purpose set forth.

13. The side holders, R R, having a horizontally-reciprocating motion, and vertically raised and depressed to act upon the tubes while passing through the forming devices, as described, in combination with the movable table H and plate N, actuated to approach toward and separate from one another, and the folders O P, similarly operated, substantially as specified.

14. The side holders or guides, R R, in combination with levers $r'$, springs $r^3$, slides $r^2$, and levers $r^4$, substantially as shown and described.

15. In combination with the stationary paste-cup $t^8$ and its pasting-roller $t^7$, the paster-brush T, having the movements, substantially as described, derived from the slide $t^4$, slotted plate $t^5$, link $t^2$, and lever $t'$, as shown and set forth.

16. In combination, the former A A $A^2$, the steam-box D, its operating-lever D', and cam to move it, substantially as shown and described.

17. The feed-rollers B B, grooved as described, in combination with the skeleton-frame A $A^2$ and with the bar or arm $e^3$ of the plate E, the combination permitting this bar to operate the said plate at the same time that the feed-rollers are feeding the paper.

18. In combination, the tube-former A A $A^2$, the intermittingly-acting steam-box, grooved feed-rollers B B, and the described devices for forming the bottom of the bag.

19. In combination, the tube-former A A $A^2$, steam-box D, grooved rollers B B, bottom-forming devices, and the pressure-pad W, the combination operating as set forth.

20. In combination, the tube-former A A $A^2$, steam-box D, grooved rollers B B, bottom-forming devices, pressure-pad W, and the paster T, the combination operating as set forth.

21. In combination, the tube-former A A $A^2$, steam-box D, grooved rollers B B, bottom-forming devices, pressure-pad W, paster T, and the shears *c c'*, the combination operating as set forth.

ALMON B. GLOVER.

Witnesses:
THOS. S. BIRDSEY,
S. E. DOWNS.